United States Patent

Penzo et al.

(10) Patent No.: US 10,131,719 B2
(45) Date of Patent: Nov. 20, 2018

(54) PROCESS FOR DEGASSING AND BUFFERING POLYOLEFIN PARTICLES OBTAINED BY OLEFIN POLYMERIZATION

(71) Applicant: Basell Polyolefine GmbH, Wesseling (DE)

(72) Inventors: Giuseppe Penzo, Ferrara (IT); Giulia Mei, Ferrara (IT); Gabriele Mei, Ferrara (IT); Antonio De Lucia, Amsterdam (NL); Pietro Baita, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 613 days.

(21) Appl. No.: 14/651,124

(22) PCT Filed: Dec. 11, 2013

(86) PCT No.: PCT/EP2013/076185
§ 371 (c)(1),
(2) Date: Jun. 10, 2015

(87) PCT Pub. No.: WO2014/090856
PCT Pub. Date: Jun. 19, 2014

(65) Prior Publication Data
US 2015/0315302 A1 Nov. 5, 2015

(30) Foreign Application Priority Data

Dec. 11, 2012 (EP) .................................... 12196450

(51) Int. Cl.
*C08F 6/00* (2006.01)
*B29B 13/02* (2006.01)
(Continued)

(52) U.S. Cl.
CPC ............... *C08F 6/005* (2013.01); *B01J 8/005* (2013.01); *B01J 8/1836* (2013.01); *B01J 8/24* (2013.01);
(Continued)

(58) Field of Classification Search
CPC . B29C 47/0004; B29C 47/0009; C08F 6/005; B29B 9/12; B29B 13/022; B01J 8/005; B01J 8/24; B01J 8/1836
See application file for complete search history.

(56) References Cited

U.S. PATENT DOCUMENTS 5,541,270 A * 7/1996 Chinh .................... B01J 8/1809
526/348
5,681,908 A * 10/1997 Mehra .................... B01J 8/0035
526/68
(Continued)

FOREIGN PATENT DOCUMENTS

CN 1167779 A 12/1997
CN 1333787 A 1/2002
(Continued)

OTHER PUBLICATIONS

PCT International Search Report & Written Opinion dated Mar. 5, 2014, for PCT/EP2013/076185.

*Primary Examiner* — Matthew J Daniels
*Assistant Examiner* — Emmanuel S Luk

(57) ABSTRACT

Process for preparing a polyolefin polymer comprising the steps of
a) forming a particulate polyolefin polymer by polymerizing one or more olefins in the presence of a polymerization catalyst system in a polymerization reactor;
b) discharging the formed polyolefin particles from the polymerization reactor;

(Continued)

c) degassing the polyolefin particles by a process comprising at least a final step of contacting the polyolefin particles with a nitrogen stream in a degassing vessel; and d) transferring the polyolefin particles from the vessel, in which the contacting of the polyolefin particles with the nitrogen stream is carried out, to a melt mixing device, in which the polyolefin particles are melted, mixed and thereafter pelletized, without passing the particles through a buffering device, wherein the degassing vessel is only partly filled with polyolefin particles and the empty volume within the degassing vessel is sufficient to take up additional polyolefin particles for at least 3 hours if the transfer of polyolefin particles of step d) from the degassing vessel to the melt mixing device is discontinued and the discharge of polyolefin particles from the polymerization reactor according to step b) is continued with unchanged rate.

20 Claims, 1 Drawing Sheet

(51) Int. Cl.

| | |
|---|---|
| *B29B 9/12* | (2006.01) |
| *B29C 47/00* | (2006.01) |
| *C08F 10/00* | (2006.01) |
| *B29B 13/00* | (2006.01) |
| *B01J 8/18* | (2006.01) |
| *B01J 8/24* | (2006.01) |
| *B01J 8/00* | (2006.01) |
| *B29L 31/00* | (2006.01) |
| *B29K 23/00* | (2006.01) |

(52) U.S. Cl.
CPC ............... *B29B 9/12* (2013.01); *B29B 13/00* (2013.01); *B29B 13/022* (2013.01); *B29C 47/0004* (2013.01); *B29C 47/0009* (2013.01); *C08F 10/00* (2013.01); *B01J 2208/00176* (2013.01); *B01J 2208/00274* (2013.01); *B01J 2208/00991* (2013.01); *B01J 2219/00006* (2013.01); *B29B 2013/005* (2013.01); *B29K 2023/00* (2013.01); *B29L 2031/772* (2013.01)

(56) References Cited

U.S. PATENT DOCUMENTS

| | | | |
|---|---|---|---|
| 5,799,412 A † | 9/1998 | Yamamoto | |
| 7,157,540 B2 | 1/2007 | Ohtani et al. | |
| 7,582,723 B2 † | 9/2009 | Penzo | |
| 7,812,102 B2 | 10/2010 | Kivela et al. | |
| 8,314,197 B2 | 11/2012 | Chamayou et al. | |
| 8,497,346 B2 | 7/2013 | Chamayou et al. | |
| 9,126,353 B2 * | 9/2015 | Rahim | B29B 7/465 |
| 9,745,389 B2 * | 8/2017 | Chamayou | C08F 6/005 |
| 2006/0063896 A1 | 3/2006 | McElvain et al. | |
| 2010/0004408 A1 | 1/2010 | Baita et al. | |
| 2011/0190465 A1 | 8/2011 | Hottovy et al. | |
| 2014/0114038 A1* | 4/2014 | Hecker | C08F 10/00 526/348 |

FOREIGN PATENT DOCUMENTS

| | | | |
|---|---|---|---|
| CN | 1450096 A | | 10/2003 |
| CN | 101107273 A | | 1/2008 |
| CN | 102781564 A | | 11/2012 |
| EP | 2357035 | † | 8/2011 |
| RU | 2456300 C2 | | 7/2012 |
| WO | WO 2006/026493 A1 | | 3/2006 |
| WO | WO 2008/015228 A2 | | 2/2008 |
| WO | WO-2010037656 A1 | | 4/2010 |
| WO | WO 2011/097119 A1 | | 8/2011 |

\* cited by examiner
† cited by third party

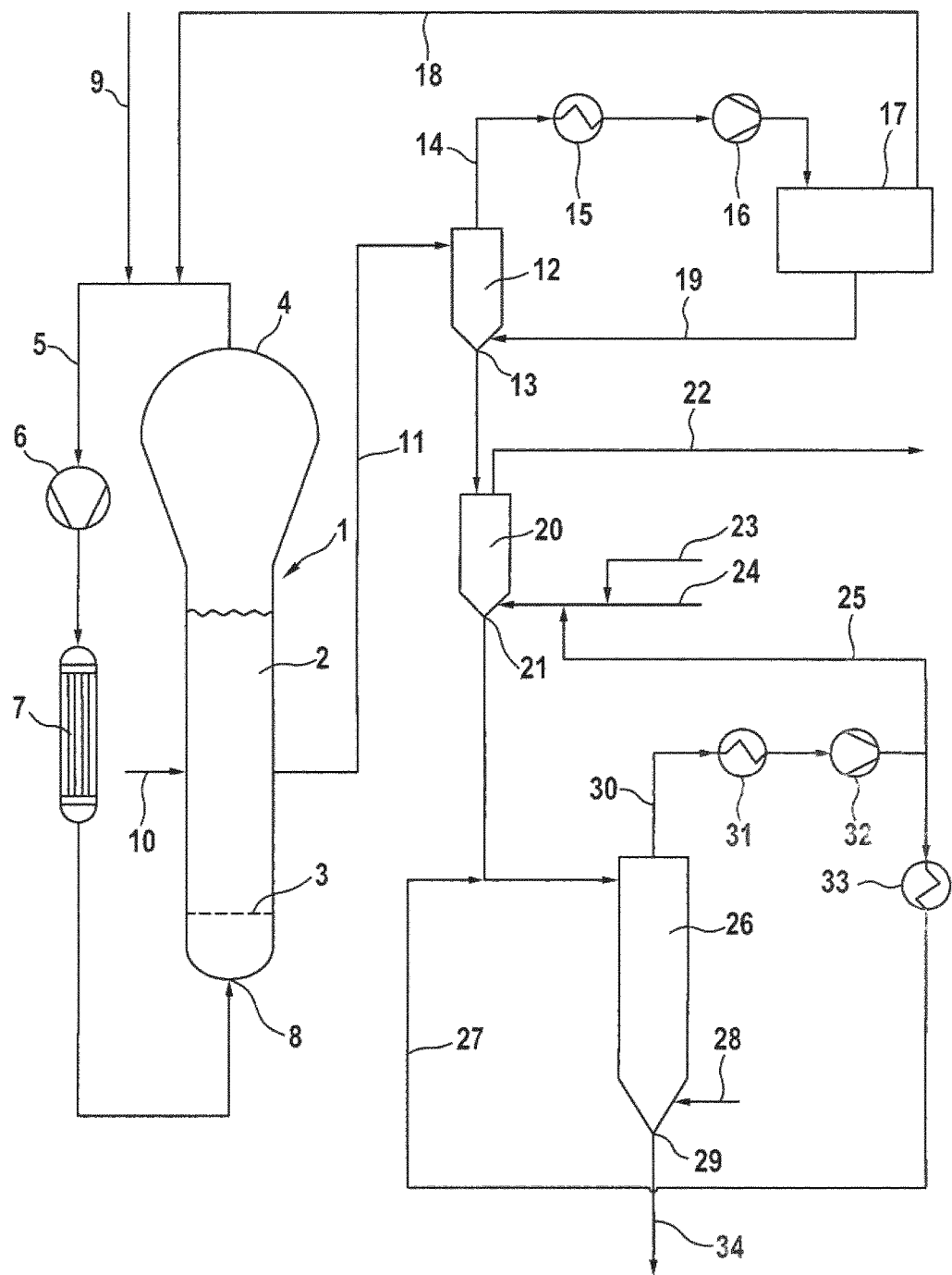

PROCESS FOR DEGASSING AND BUFFERING POLYOLEFIN PARTICLES OBTAINED BY OLEFIN POLYMERIZATION

This application is the U.S. National Phase of PCT International Application PCT/EP2013/076185, filed Dec. 11, 2013, claiming benefit of priority to European Patent Application No. 12196450.6, filed Dec. 11, 2012, the contents of which are incorporated herein by reference in their entirety.

FIELD OF THE INVENTION

The present invention relates to a process in which polyolefin particles formed by polymerizing one or more olefins in the presence of a polymerization catalyst system in a polymerization reactor are discharged from the polymerization reactor, degassed by a process comprising a step of contacting the polyolefin particles with a nitrogen stream in a degassing vessel and then transferred to a melt mixing device, in which the polyolefin particles are melted, mixed and thereafter pelletized.

BACKGROUND OF THE INVENTION

Olefins polymers like polypropylene or polyethylene are widely used commercial polymers, whose success is based not only on the facts that it is possible to carry out the production at relatively low costs but also that the obtained materials meet the requirements with respect to good product properties and processability.

When the formed polyolefin particles are removed from the polymerization reactor, the discharged product is not pure polyolefin but contains portions of the medium, in which the polymerization took place. If the polymerization was carried out as gas-phase polymerization, the gaseous phase is partly concomitantly discharged as intergranular gas or as dissolved hydrocarbons. If the polymerization was a suspension polymerization, parts of the liquid suspension medium still adhere to the polyolefin particles after mechanical separation of liquid and solid phase and hydrocarbons are also dissolved in the polyolefin particles. For ecological, safety and quality reasons, these entrained parts of the polymerization medium have to be removed from the polyolefin particles because its components constitute an impact on the environment, gaseous hydrocarbons may result in the formation of explosive mixtures in downstream equipment and remaining non-polymerized components in the final polyolefin polymers may cause problems of quality such as odor formation. Furthermore, it is desirable to recycle unreacted monomer and comonomer to the polymerization process.

To remove the entrained parts of the polymerization medium from the polyolefin particles, it is therefore common practice to contact the particles with a stream of an inert gas, usually in countercurrent flow. Such a step is frequently denoted as "degassing" or "purging". Often such a degassing or purging step is combined with a step of deactivating the polymerization catalyst and/or cocatalysts, e.g. by reacting the catalyst and/or cocatalysts with water.

For examples, EP 339 122 A1 discloses a two-step method for removing unpolymerized gaseous monomers from a solid olefin polymer while deactivating Ziegler-Natta catalysts and organometallic catalyst residues present in said solid olefin polymer, which is carried out in a single vessel. The solid olefin polymer is first countercurrently contacted with a first purge gas, preferably pure nitrogen, in an upper zone of the purge vessel, then transferred in the lower zone of the purge vessel and there countercurrently contacted with a second purge gas containing water, preferably pure nitrogen and steam.

U.S. Pat. No. 5,071,950 refers to a process for the continuous preparation of an ethylene/α-olefin copolymer in which the resulting ethylene copolymers are transferred to a let-down zone of reduced pressure and then the solid copolymer is freed of residual monomers and odor and flavor substances in a two-step way by first flushing with gaseous ethylene and then flushing with a mixture of nitrogen and steam. Similarly, EP 683 176 A1 describes a process for continuously manufacturing ethylene (co-)polymer in a gaseous phase in which the solid (co)polymer, after having passed a depressurization zone, is subjected to (1) a non-deactivating flushing with respect to the active catalytic residues, and subsequently (2) a deactivating flushing with a gaseous mixture of nitrogen, water and oxygen. Preferably, the gas for the non-deactivating flushing is the gaseous reaction mixture which circulates in the polymerization zone.

WO 2006/082007 A1 discloses an ethylene polymerization process in a gas-phase reactor in which the obtained polymer particles are discharged from the reactor, separated from the major part of the concomitantly discharged reactor gas and thereafter degassed, wherein the degassing is carried out with a propane fraction separated from the concomitantly discharged reactor gas.

WO 2008/015228 A2 describes a process to perform the finishing of polyolefins produced by gas-phase catalytic polymerization of one or more α-olefins in the presence of a polymerization diluent selected from a $C_3$-$C_5$ alkane, in which the polyolefin particles discharged from the gas-phase reactor are subjected to a first degassing step in which the polyolefin particles are countercurrently contacted with a gaseous stream containing at least 85 mol-% of a $C_3$-$C_5$ alkane and then to a second degassing step in which the polyolefin particles are countercurrently contacted with steam.

After having been degassed, the polyolefin particles are usually transferred to a melt mixing device such as an extruder or continuous mixer, in which the polyolefin particles, usually together with common additives, are melted, mixed and thereafter pelletized.

Furthermore, it is common practice that the polyolefin particles after having been degassed are first transferred to a storing unit such as a powder silo. This powder silo can serve as buffer if the work-up of the polyolefin particles is interrupted for a certain period of time such as for example if the cutting blades of the granulator of the melt mixing device need to be changed. The buffering allows, usually for several hours, continued operation of the polymerization reactor with stopping the polymerization. Otherwise a quite elaborated re-starting procedure would have to be carried out to resume the polymerization. Such a set-up however requires the installation of storage containers between degassing and pelletizing of the polyolefin particles and furthermore equipment for the pneumatic transfer of the particles from one vessel to the next has to be provided. Moreover, every additional pneumatic transport step results not only in additional investment costs but also in increased operational costs.

Thus, it was the object of the present invention to overcome the disadvantages of the prior art and to find a possibility for still having the flexibility to continue with the polymerization in the polymerization reactor for a certain time period if the melt mixing device is stopped, however without the necessity to install storage containers between degassing and pelletizing of the polyolefin particles and minimizing the requirement for pneumatic transport of the polyolefin particles.

SUMMARY OF THE INVENTION

We found that this object is achieved by a process for preparing a polyolefin polymer comprising the steps of
- a) forming a particulate polyolefin polymer by polymerizing one or more olefins in the presence of a polymerization catalyst system in a polymerization reactor;
- b) discharging the formed polyolefin particles from the polymerization reactor;
- c) degassing the polyolefin particles by a process comprising at least a final step of contacting the polyolefin particles with a nitrogen stream in a degassing vessel; and
- d) transferring the polyolefin particles from the vessel, in which the contacting of the polyolefin particles with the nitrogen stream is carried out, to a melt mixing device, in which the polyolefin particles are melted, mixed and thereafter pelletized, without passing the particles through a buffering device, wherein the degassing vessel is only partly filled with polyolefin particles and the empty volume within the degassing vessel is sufficient to take up additional polyolefin particles for at least 3 hours if the transfer of polyolefin particles of step d) from the degassing vessel to the melt mixing device is discontinued and the discharge of polyolefin particles from the polymerization reactor according to step b) is continued with unchanged rate.

BRIEF DESCRIPTION OF THE DRAWINGS

The features and advantages of the present invention can be better understood via the following description and the accompanying drawing which shows schematically a preferred set-up for preparing a polyolefin polymer according to the process of the present invention.

FIG. 1 shows schematically a polymerization system for preparing a polyolefin polymer according to the process of the present invention.

DETAILED DESCRIPTION OF THE INVENTION

The present invention provides a process for preparing a polyolefin polymer by polymerizing one or more olefins. Suitable olefins for such a polymerization are especially 1-olefins, i.e. hydrocarbons having terminal double bonds, without being restricted thereto. Suitable olefins monomers can however also be functionalized olefinically unsaturated compounds. Preference is given to linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene or conjugated and nonconjugated dienes such as 1,3-butadiene, 1,4-hexadiene or 1,7-octadiene. Suitable olefins also include ones in which the double bond is part of a cyclic structure which can have one or more ring systems. Examples are cyclopentene, norbornene, tetracyclododecene or methylnorbornene or dienes such as 5-ethylidene-2norbornene, norbornadiene or ethylnorbornadiene. It is also possible to polymerize mixtures of two or more olefins.

The process is in particular suitable in the homopolymerization or copolymerization of ethylene or propylene and is especially preferred for the homopolymerization or copolymerization of ethylene. Preferred comonomers in propylene polymerization are up to 40 wt.-% of ethylene and/or 1-butene, preferably from 0.5 wt.-% to 35 wt.-% of ethylene and/or 1-butene. As comonomers in ethylene polymerization, preference is given to using up to 20 wt.-%, more preferably from 0.01 wt.-% to 15 wt.-% and especially from 0.05 wt.-% to 12 wt.-% of $C_3$-$C_8$-1-alkenes, in particular 1-butene, 1-pentene, 1-hexene and/or 1-octene. Particular preference is given to a process in which ethylene is copolymerized with from 0.1 wt.-% to 12 wt.-% of 1-hexene and/or 1-butene.

Step a) of the process for preparing a polyolefin polymer according to the present invention is forming a particulate polyolefin polymer in the presence of a polymerization catalyst system. Suitable are all customarily used olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally an electron donor compound and/or a particulate inorganic oxide as support. Such Ziegler type catalysts are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

The process for preparing the polyolefin polymers according to the present invention is not restricted to any specific polymerization process. All industrially known low-pressure polymerization processes can be used as long as they result in particulate polyolefins. They can be carried out batchwise or preferably continuously in one or more stages. Such processes are generally known to those skilled in the art. Gas-phase polymerization, in particular in gas-phase fluidized-bed reactors or multizone gas-phase reactors and suspension polymerization, in particular in loop reactors or stirred tank reactors, are preferred.

In a preferred embodiment of the present invention the process for preparing the polyolefin polymers is a suspension polymerization in a suspension medium, preferably in an inert hydrocarbon such as isobutane, hexane or mixtures of hydrocarbons or else in the monomers themselves. Suspension polymerization temperatures are usually in the range from 20 to 115° C., and the pressure is in the range of from 0.1 to 10 MPa. The solids content of the suspension is generally in the range of from 10 to 80 wt.-%. The polymerization can be carried out both batchwise, e.g. in stirred autoclaves, and continuously, e.g. in tubular reactors, preferably in loop reactors. In particular, it can be carried out by the Phillips PF process as described in U.S. Pat. No. 3,242,150 and U.S. Pat. No. 3,248,179.

Suitable suspension media are all media which are generally known for use in suspension reactors. The suspension medium should be inert and be liquid or supercritical under the reaction conditions and should have a boiling point which is significantly different from those of the monomers and comonomers used in order to make it possible for these starting materials to be recovered from the product mixture by distillation. Customary suspension media are saturated hydrocarbons having from 4 to 12 carbon atoms, for example isobutane, butane, propane, isopentane, pentane and hexane, or a mixture of these, which is also known as diesel oil.

In a preferred suspension polymerization process, the polymerization takes place in a cascade of two or preferably three or four stirred vessels. The molecular weight of the polymer fraction prepared in each of the reactors is preferably set by addition of hydrogen to the reaction mixture. The polymerization process is preferably carried out with the highest hydrogen concentration and the lowest comonomer concentration, based on the amount of monomer, being set in the first reactor. In the subsequent further reactors, the hydrogen concentration is gradually reduced and the comonomer concentration is altered, in each case once again based on the amount of monomer. Ethylene or propylene is preferably used as monomer and a 1-olefin having from 4 to 10 carbon atoms is preferably used as comonomer.

A further, preferred suspension polymerization process is suspension polymerization in loop reactors, where the polymerization mixture is pumped continuously through a cyclic reactor tube. As a result of the pumped circulation, continual mixing of the reaction mixture is achieved and the catalyst introduced and the monomers fed in are distributed in the reaction mixture. Furthermore, the pumped circulation prevents sedimentation of the suspended polymer. The removal of the heat of reaction via the reactor wall is also promoted by the pumped circulation. In general, these reactors consist essentially of a cyclic reactor tube having one or more ascending legs and one or more descending legs which are enclosed by cooling jackets for removal of the heat of reaction and also horizontal tube sections which connect the vertical legs.

In a further preferred embodiment of the present invention, the process for preparing the polyolefin polymers is a gas-phase polymerization, i.e. a process in which the solid polymers are obtained from a gas-phase comprising the monomer or the monomers. Suitable reactors for such a gas-phase polymerization are, for example, horizontally or vertically stirred gas-phase reactors, multizone gas-phase reactors, or gas-phase fluidized-bed reactors. Reactors of these types are generally known to those skilled in the art.

The gas-phase polymerization is usually carried out at pressures of from 0.1 MPa to 10 MPa, preferably from 0.5 MPa to 8 MPa and in particular from 1.0 MPa to 3 MPa. The polymerization temperature is customarily from 30° C. to 160° C. and preferably from 65° C. to 125° C.

Particular preference is given to a gas-phase polymerization in a fluidized-bed reactor, i.e. a reactor comprising a bed of polymerizing polymer particles which are kept in fluidized state by introducing a gas from below. This gas is then usually taken off at the upper end of the reactor, cooled to remove the heat of polymerization and recirculated back into the reactor at its lower end. The circulated reaction gas is usually a mixture of the olefins to be polymerized, inert gases such as nitrogen and/or lower alkanes such as ethane, propane, butane, pentane or hexane as polymerization diluent and optionally other inert gases like nitrogen or further alkanes and/or a molecular weight regulator such as hydrogen. The polymerization can also be carried out in a condensing or super-condensing mode, in which part of the circulating gas is cooled to below the dew point and returned to the reactor separately as a liquid and a gas phase or together as a two-phase mixture in order to make additional use of the enthalpy of vaporization for cooling the reaction gas.

Particularly preferred gas-phase polymerization reactors are further multizone circulating reactors which are, for example, described in WO 97/04015 and WO 00/02929 and have two interconnected polymerization zones, a riser, in which the growing polymer particles flow upward under fast fluidization or transport conditions and a downcomer, in which the growing polymer particles flow in a densified form under the action of gravity. The polymer particles leaving the riser enter the downcomer and the polymer particles leaving the downcomer are reintroduced into the riser, thus establishing a circulation of polymer between the two polymerization zones and the polymer is passed alternately a plurality of times through these two zones. It is further also possible to operate the two polymerization zones of one multizone circulating reactor with different polymerization conditions by establishing different polymerization conditions in its riser and its downcomer. For this purpose, the gas mixture leaving the riser and entraining the polymer particles can be partially or totally prevented from entering the downcomer. This can for example be achieved by feeding a barrier fluid in form of a gas and/or a liquid mixture into the downcomer, preferably in the upper part of the downcomer. The barrier fluid should have a suitable composition, different from that of the gas mixture present in the riser. The amount of added barrier fluid can be adjusted in a way that an upward flow of gas countercurrent to the flow of the polymer particles is generated, particularly at the top thereof, acting as a barrier to the gas mixture entrained among the particles coming from the riser. In this manner it is possible to obtain two different gas composition zones in one multizone circulating reactor. Furthermore it is also possible to introduce make-up monomers, comonomers, molecular weight regulator such as hydrogen and/or inert fluids at any point of the downcomer, preferably below the barrier feeding point. Thus, it is also easily possible to create varying monomer, comonomer and hydrogen concentrations along the downcomer resulting in a further differentiation of the polymerization conditions.

In an especially preferred gas-phase polymerization process, the polymerization is carried out in the presence of a $C_3$-$C_5$ alkane as polymerization diluent and preferably in the presence of propane, especially in the case of homopolymerization or copolymerization of ethylene.

The obtained polyolefin particles have a more or less regular morphology and size, depending on the catalyst morphology and size, and on polymerization conditions. Depending on the catalyst used, the polyolefin particles usually have a mean diameter of from a few hundred to a few thousand micrometers. In the case of chromium catalysts, the mean particle diameter is usually from about 300 to about 1600 μm, and in the case of Ziegler type catalysts the mean particle diameter is usually from about 500 to about 3000 μm.

In step b) of to the process of the present invention, the polyolefin particles formed in step a) are discharged from the polymerization reactor. The discharge can be carried out pneumatically or with the aid of mechanical discharge systems, with pneumatic discharge being preferred. In the simplest and particularly preferred case, the discharge is achieved by means of the pressure gradient prevailing between the polymerization reactor and the first downstream vessel. Preferably the polyolefin particles are discharged continuously from the gas-phase polymerization reactor.

After being discharged, the polyolefin particles are degassed in step c) by a degassing process which comprises at least a final step of contacting the polyolefin particles with a nitrogen stream in a degassing vessel. The whole degassing process may comprise only one degassing step. Preferably the degassing process of step c) comprises at least two, more preferably at least three subsequent degassing steps. According to the process of the present invention, the final degassing step of this degassing process is a step of contacting the polyolefin particles with a nitrogen stream from which the polyolefin particles are, in step d), transferred to a melt mixing device, in which the polyolefin particles are melted, mixed and thereafter pelletized, without being passed through a buffering device, which is arranged between this degassing vessel for carrying out the final degassing step and the melt mixing device.

After the discharge, the polyolefin particles have to be separated from the major part of the concomitantly discharged reaction medium. If the polymerization is a suspension polymerization, this separation is usually a mechanical separation of liquid and solid phase. If the polymerization was carried out as gas-phase polymerization, the separation can be carried out together with or separately from a first degassing step of the polyolefin particles, either in terms of time or in terms of space. That means, the separation of the solid polyolefin particles from the major part of the reaction gas can be carried out in a separation vessel, which is usually operated at a pressure between the pressure in the polymerization reactor and the pressure in this first degassing vessel and preferably operated at a pressure of from 0.5 MPa to 3 MPa, more preferably of from 1 MPa to 2 MPa, and the polyolefin particles are thereafter transferred to the first degassing vessel. As an alternative, in the case of discontinuous discharge, it is also possible that the polyolefin particles are directly discharged into the first degassing vessel, the major part of the reaction gas is then separated off from the polyolefin particles and thereafter a first degassing step is carried out in the same vessel. In a further preferred embodiment of the present invention, the polyolefin particles are directly discharged into the first degassing vessel in which the polyolefin particles are simultaneously separated from the major part of the concomitantly discharged reaction gas and exposed to the first degassing step.

According to the process of the present invention, the final degassing step is carried out by contacting the polyolefin particles with a stream of nitrogen in a degassing vessel. The contacting of the polyolefin particles and the stream of nitrogen is preferably carried out countercurrently. In such a case, the polyolefin particles are preferably introduced at the top of the degassing vessel and move downwards by gravity in contact with a countercurrent flow of a nitrogen stream introduced at the bottom of the degassing vessel.

Preferably the final degassing step is carried out at a pressure of from 0.1 MPa to 0.2 MPa, more preferably of 0.1 MPa to 0.15 MPa and a temperature of from 50° C. to 120° C., more preferably of from 60° C. to 100° C. and in particular of from 70° C. to 90° C. The average residence time of the polyolefin particles in the degassing vessel for the final degassing step is preferably from 5 minutes to 10 hours, more preferably from 10 minutes to 6 hours and in particular from 20 minutes to 4 hours. After the final degassing step, the residual loading of the polyolefin particles polymer with hydrocarbons of four or more carbon atoms such as 1-butene, 1-hexene or hexane should be preferably not more than 50 ppm by weight.

According to the present invention, the degassing vessel for carrying out the final degassing step, is only partly filled with polyolefin particles and the empty volume within this vessel is sufficient to take up additional polyolefin particles for at least 3 hours, preferably for at least 4 hours, if the transfer of polyolefin particles of step d) from the degassing vessel to the melt mixing device is discontinued and the discharge of polyolefin particles from the polymerization reactor according to step b) is continued with unchanged rate. The final degassing vessel has accordingly not only the function of housing a step for the degassing of the polyolefin particles but also acts as buffer if the downstream work-up of the polyolefin particles is interrupted for a limited period of time, such as for example if the melt mixing device is stopped for a change of blades. It is then possible to continue with polymerizing at unchanged rate and store the produced polyolefin particles temporarily in the final degassing vessel until the melt mixing device is restarted. This permits to avoid installing other buffer units between the degassing and pelletizing of the polyolefin particles and therefore allows reducing the complexity of the polyolefin particle flow.

After having been treated in the final degassing vessel, the polyolefin particles are transferred to a melt mixing device, such as an extruder or continuous mixer. These extruders or mixers, in which the polyolefin particles are melted by heating, can be single- or two-stage machines. Other possibilities are combinations of mixers with discharge screws and/or gear pumps. Preferred extruders are screw extruders, and these may be constructed as single- or twin-screw machines. Particular preference is given to twin-screw extruders and continuous mixers with discharge elements. Machinery of this type is conventional in the plastics industry. A melting of a polymer in such machinery is always accompanied by homogenizing the polymer.

The melting of the polyolefin particles is preferably carried out at from 150° C. to 350° C. and particularly preferably at from 180° C. to 300° C. As usually in the processing of polymers, it is further preferred possible that the polyolefin particles are not only melted but also furnished with one or more additives such as stabilizers, antioxidants, lubricants, antiblocking or antistatics agents, pigments or dyes.

In a preferred embodiment of the present invention, the degassing vessel for carrying out the final degassing step is located above the melt mixing device and the transfer from the degassing vessel to the melt mixing device is carried out by means of gravity. Such an arrangement of the equipment reduces the complexity of the polyolefin particle flow and permits to operate without pneumatic transport for particle transportation. It is further possible to carry out the final degassing step in a parallel arrangement in two or more final degassing vessels.

In the preferred embodiment of the present invention, in which the degassing process comprises more than one degassing step, it is further preferred that the transfer or the polyolefin particles from the penultimate degassing step to the final degassing step is carried out pneumatically by a gas stream, which is at least partly composed of nitrogen which had previously been used for degassing the polyolefin particles in the final degassing step. Such an arrangement avoid that fresh gases have to be added for transporting purposes.

Preferably this used nitrogen comes from the gas mixture, which is withdrawn from the final degassing vessel, preferably from its top, and is composed, after the contacting of the nitrogen stream with the polyolefin particles, of nitrogen enriched in unreacted comonomers, oligomers and other hydrocarbons. This gas mixture is preferably cooled in a heat exchanger, compressed and then, after being cooled in a further heat exchanger, reused for pneumatically transporting the polyolefin particles from the penultimate degassing vessel to the final degassing vessel.

It is further preferred that the degassing step carried out immediately before the final step of the degassing process, in which the polyolefin particles are contacted with the nitrogen stream, is a step which includes a deactivation of the catalyst system. Such a deactivation is preferably carried out by contacting the polyolefin particles with a stream comprising nitrogen and steam. In such a case, it is especially preferred that at least a part of the nitrogen in the stream comprising nitrogen and steam had previously been used in the final step of the degassing process and comes, usually after being cooled and compressed, from the gas mixture withdrawn from the final degassing vessel.

Preferably, the contacting of the polyolefin particles with the stream comprising nitrogen and steam in the penultimate degassing vessel is carried out countercurrently. In such a case, the polyolefin particles are preferably introduced at the top of the penultimate degassing vessel and move downwards by gravity in contact with a countercurrent flow of the stream comprising nitrogen and steam introduced at the bottom of the degassing vessel. The stream comprising nitrogen and steam for degassing the polyolefin particles in the penultimate degassing vessel preferably comprises steam in an amount that no condensation of water occurs at the conditions within the penultimate degassing vessel. The stream comprises preferably from 2 mol-% to 20 mol-%, more preferably from 5 mol-% to 15 mol-% of water vapor. The steam is preferably added in form of superheated or saturated steam and in particular in form of slightly superheated steam. Preferably the stream comprising nitrogen and steam is fed to the penultimate degassing vessel in an amount of from 10 kg to 150 kg per 1000 kg of polyolefin particles to be treated and in particular in an amount of from 20 kg to 80 kg per 1000 kg of polyolefin particles to be treated.

Subsequent to contacting the stream comprising nitrogen and steam with the polyolefin particles, a gas mixture enriched in unreacted comonomers, oligomers, other hydrocarbons and comprising reaction products of the reaction of the water vapor with the components of the polymerization catalyst system is withdrawn from the penultimate degassing vessel, preferably from its top. Preferably, this gas mixture is taken off the polymerization system as off-gas and, after having passed a simple neutralization unit, disposed, for example via a catalytical oxidation unit.

Preferably the penultimate step of the degassing process is carried out at a pressure of from 0.1 MPa to 0.35 MPa, more preferably of 0.11 MPa to 0.25 MPa and a temperature of from 50° C. to 120° C., more preferably of from 60° C. to 100° C. and in particular of from 70° C. to 90° C. The average residence time of the polyolefin particles in the penultimate degassing vessel is preferably from 5 minutes to 2 hours and more preferably from 10 minutes to 1 hour. The residual loading of the polyolefin particles polymer with hydrocarbons of four or more carbon atoms such as 1-butene, 1-hexene or hexane should be preferably not more than 1000 ppm by weight and particularly preferably not more than 400 ppm by weight.

In an especially preferred embodiment of the present invention, the degassing process comprises at least one further degassing step before the penultimate degassing step including the deactivation of the catalyst system. It is in particular preferred that the degassing process comprises three degassing steps.

In case the polymerization is a gas-phase polymerization in the presence of a $C_3$-$C_5$ alkane as polymerization diluent it is in particular preferred that the first degassing step of the degassing process is carried out by contacting the polyolefin particles with a gaseous stream comprising at least 85 mol-% of the $C_3$-$C_5$ alkane used as diluent in the gas-phase polymerization reactor. Preferably the polyolefin particles coming from the gas-phase polymerization reactor and the gaseous stream comprising at least 85 mol-% of $C_3$-$C_5$ alkane are contacted countercurrently. The polyolefin particles are then preferably introduced in the upper portion of the first degassing vessel and move downwards by gravity in contact with a countercurrent flow of a gaseous stream introduced at the bottom of the degassing vessel. This gaseous stream comprises preferably at least 85 mol-%, especially more than 95 mol-% of $C_3$-$C_5$ alkane. Preferably the $C_3$-$C_5$ alkane is propane, butane or pentane or a mixtures thereof or of their isomers and in particular that the $C_3$-$C_5$ alkane is propane. Preferably the gaseous stream comprising at least 85 mol-% of $C_3$-$C_5$ alkane is fed to the degassing vessel in an amount of from 10 kg to 200 kg per 1000 kg of polyolefin particles to be treated.

Subsequent to contacting the gaseous stream comprising at least 85 mol-% of $C_3$-$C_5$ alkane with the polyolefin particles, a gas mixture enriched in unreacted monomers, comonomers, oligomers and other hydrocarbons is withdrawn from the first degassing vessel, preferably from its top. This gas mixture is then preferably conveyed to an alkane and monomer recovery unit, in which the gas mixture is separated in fractions which can easily be recycled in purified form to the polymerization process. Preferably the material for forming the gaseous stream in the first degassing step comes directly from this alkane and monomer recovery unit. Methods and apparatuses for separating and purifying such gas mixture are well known in the art and are, for example, described in WO 2006/082007 A1. The conveying of the gas mixture withdrawn from the first degassing vessel to the alkane and monomer recovery unit is preferably carried out by means of a compressor. In the course of this conveying step it is further possible to pass the gas mixture through a heat exchanger.

Preferably the first degassing step is carried out at a pressure of from 0.1 MPa to 0.4 MPa, more preferably of 0.12 MPa to 0.35 MPa and in particular of from 0.15 MPa to 0.3 MPa and a temperature of from 50° C. to 120° C., more preferably of from 60° C. to 100° C. and in particular of from 70° C. to 90° C. The average residence time of the polyolefin particles in the first degassing vessel is preferably from 5 minutes to 5 hours, more preferably from 10 minutes to 4 hours and in particular from 15 minutes to 2 hours.

After the first degassing step, the residual loading of the polyolefin particles polymer with hydrocarbons of four or more carbon atoms such as 1-butene, 1-hexene or hexane should be low so as to keep the loss of hydrocarbons as low as possible. Preference is given to a residual loading of equal to or less than 2500 ppm by weight, particularly preferably equal to or less than 1000 ppm by weight.

FIG. 1 shows schematically a polymerization system for preparing a polyolefin polymer according to the process of the present invention.

Gas-phase polymerization reactor (1) is a fluidized-bed reactor comprising a fluidized bed (2) of polyolefin particles, a gas distribution grid (3) and a velocity reduction zone (4). The velocity reduction zone (4) is generally of increased diameter compared to the diameter of the fluidized-bed portion of the reactor. The polyolefin bed is kept in a fluidization state by an upwardly flow of gas fed through the gas distribution grid (3) placed at the bottom portion of the reactor (1). The gaseous stream of the reaction gas leaving the top of the velocity reduction zone (4) via recycle line (5) is compressed by compressor (6), transferred to a heat exchanger (7), in which it is cooled, and then recycled to the bottom of the fluidized-bed reactor (1) at a point below the gas distribution grid (3) at position (8). The recycle gas can, if appropriate, be cooled to below the dew point of one or more of the recycle gas components in the heat exchanger so as to operate the reactor with condensed material, i.e. in the condensing mode. The recycle gas comprises, besides unreacted monomers, a $C_3$-$C_5$ alkane as polymerization diluent. Make-up monomers, molecular weight regulators, and process additives can be fed into the reactor (1) at various positions, for example via line (9) upstream of the compressor (6); this non-limiting the scope of the invention. Generally, the catalyst is fed into the reactor (1) via a line (10) that is preferably placed in the lower part of the fluidized bed (2).

The polyolefin particles obtained in fluidized-bed reactor (1) are discharged via line (11) and fed to a first degassing vessel (12), in which the polyolefin particles are contacted with a gaseous stream of propane. However, it is also possible not to directly discharge the polyolefin particles into degassing vessel (12) but first discharge the polyolefin particles into a separation vessel (not shown), separate therein the polyolefin particles from the major part of the concomitantly discharged reaction gas and transfer the particles thereafter from the separation vessel to degassing vessel (12). Propane is fed to degassing vessel (12) at its bottom at position (13) and flows in it upwards countercurrently to the flow of the polyolefin particles. The gas leaving the degassing vessel (12) via line (14) comprises beside propane, which had been fed at position (13), reaction gas, which had been discharged from fluidized-bed reactor (1) concomitantly with the polyolefin particles, and gaseous components, which come out from the polyolefin particles. The gas stream leaving the degassing vessel (12) via line (14) is cooled in a heat exchanger (15) and transferred by compressor (16) to the propane and monomer recovery unit (17), from which purified monomers and purified propane are recycled to the fluidized-bed reactor (1) via one or more lines (18). Furthermore, purified propane is fed via line (19) from the propane and monomer recovery unit (17) to the degassing vessel (12) for carrying out the first degassing step.

At the bottom of the first degassing vessel (12), polyolefin particles are withdrawn and transferred to a second degassing vessel (20) by means of gravity. The second degassing vessel (20) is the degassing vessel for carrying out the penultimate degassing step of the degassing process shown in FIG. 1. The polyolefin particles are contacted with a stream of nitrogen and steam which is fed to the degassing vessel (20) at its bottom at position (21) and flows in it upwards countercurrently to the flow of the polyolefin particles. The conditions in the degassing vessel (20) are selected in a way that no condensation of water occurs.

The gas leaving degassing vessel (20) via line (22) exits the polymerization system as off-gas. The gas mixture for treating the polyolefin particles in the second degassing step is composed of steam fed via line (23) and nitrogen, which can be added as fresh nitrogen via line (24) or as reused nitrogen coming from the subsequent third degassing step via line (25). Preferably at least the major part of the nitrogen fed to the degassing vessel (20) at position (21) is reused nitrogen coming via line (25).

At the bottom of degassing vessel (20), polyolefin particles are withdrawn and transferred to a third degassing vessel (26) by means of reused nitrogen coming via line (27). The third degassing vessel (26) is the degassing vessel for carrying out the final degassing step of the degassing process shown in FIG. 1. In the third degassing vessel (26), the polyolefin particles are countercurrently contacted with a stream of nitrogen, which is fed as fresh nitrogen via line (28) at position (29). At the bottom of degassing vessel (26), polyolefin particles are withdrawn and transferred via line (34) to the further work-up such as being provided with polymer additives and pelletized in an extrusion step. The degassing vessel (26) is only partly filled with polyolefin particles and the empty volume within it is sufficient to take up additional polyolefin particles for at least 3 hours if the transfer of polyolefin particles via line (34) is discontinued and the discharge of polyolefin particles from the polymerization reactor via line (11) is continued with unchanged rate. The gas leaving the third degassing vessel (26) via line (30) is cooled in a heat exchanger (31), compressed by compressor (32) and fed to both line (25) for being further used as part of the gas stream in the second degassing vessel (20) and to heat exchanger (33) for being cooled and then used via line (27) for transporting polyolefin particles from degassing vessel (20) to degassing vessel (26).

What is claimed is:

1. A process for preparing a polyolefin polymer comprising the steps of
    a) forming a particulate polyolefin polymer by polymerizing one or more olefins in the presence of a polymerization catalyst system in a polymerization reactor;
    b) discharging the formed polyolefin particles from the polymerization reactor to a degassing vessel;
    c) degassing the polyolefin particles by a process comprising at least two degassing steps of contacting the polyolefin particles with a nitrogen stream in the degassing vessel; and
    d) transferring the polyolefin particles from the vessel, in which the contacting of the polyolefin particles with the nitrogen stream is carried out, to a melt mixing device, in which the polyolefin particles are melted, mixed and thereafter pelletized, without passing the particles through a buffering device,
    e) while discharging, discontinuing the transferring step for at least 4 hours, wherein the start of the discontinuing the transferring step, the degassing vessel is only partly filled with polyolefin particles.

2. The process for preparing a polyolefin polymer according to claim 1, wherein the degassing vessel is located above the melt mixing device and the transfer from the degassing vessel to the melt mixing device is carried out by means of gravity.

3. The process for preparing a polyolefin polymer according to claim 1, wherein the degassing process of step c) comprises the step of contacting the polyolefin particles with the nitrogen stream is the final step of the whole degassing process.

4. The process for preparing a polyolefin polymer according to claim 1, wherein the polyolefin particles are transferred pneumatically by a gas stream from a penultimate degassing step to a final degassing step and the gas for carrying out the pneumatic transfer is at least partly composed of nitrogen which had previously been used for degassing the polyolefin particles in the final degassing step.

5. The process for preparing a polyolefin polymer according to claim 4, wherein the degassing step carried out immediately before the final step of the degassing process, in which the polyolefin particles are contacted with the nitrogen stream, is a step which includes a deactivation of the catalyst system.

6. The process for preparing a polyolefin polymer according to claim 5, wherein the penultimate degassing step includes contacting the polyolefin particles with a nitrogen stream comprising 2 to 20 mol. %, of steam.

7. The process for preparing a polyolefin polymer according to claim 6, wherein the penultimate degassing step is carried out at conditions under which no condensation of water occurs.

8. The process for preparing a polyolefin polymer according to claim 6, wherein at least a part of the nitrogen in the stream comprising nitrogen and steam, which is used in the penultimate degassing step of the degassing process of step c), had previously been used in the final step of the degassing process.

9. The process for preparing a polyolefin polymer according to claim 5, wherein the degassing process of step c) comprises an additional degassing step before the penultimate degassing step including the deactivation of the catalyst system.

10. The process for preparing a polyolefin polymer according to claim 9, wherein the polymerization is a gas-phase polymerization in the presence of a $C_3$-$C_5$ alkane as polymerization diluent and the degassing in the first degassing step of the whole degassing process of step c) is carried out by contacting the polyolefin particles with a gaseous stream comprising at least 85 mol-% of the $C_3$-$C_5$ alkane used as diluent in the gas-phase polymerization reactor.

11. The process for preparing a polyolefin polymer according to claim 1, wherein the degassing steps are carried out by countercurrently contacting the polyolefin particles with the respective gas streams.

12. The process for preparing a polyolefin polymer according to claim 1, wherein the polyolefin polymer is a homopolymer or copolymer of ethylene.

13. A process for preparing a polyolefin polymer comprising the steps of
  a) forming a particulate polyolefin polymer by polymerizing one or more olefins in the presence of a polymerization catalyst system in a polymerization reactor;
  b) discharging the formed polyolefin particles from the polymerization reactor;
  c) degassing the polyolefin particles by a process comprising at least two degassing steps, wherein a final degassing step includes contacting the polyolefin particles with a nitrogen stream in a degassing vessel; and
  d) transferring the polyolefin particles from the degassing vessel, in which the final step of contacting of the polyolefin particles with the nitrogen stream is carried out, to a melt mixing device, in which the polyolefin particles are melted, mixed and thereafter pelletized, without passing the particles through a buffering device,
  e) while discharging, discontinuing the transferring step for at least 3 hours, wherein at the start of discontinuing the transferring step, the degassing vessel, in which the final degassing step is carried out, is only partly filled with polyolefin particles.

14. The process for preparing a polyolefin polymer according to claim 13, wherein the degassing vessel is located above the melt mixing device and the transfer from the degassing vessel to the melt mixing device is carried out by means of gravity and/or wherein the transferring step is discontinued from 3 to 4 hours.

15. The process for preparing a polyolefin polymer according to claim 13, wherein the degassing process of step c) comprises the step of contacting the polyolefin particles with the nitrogen stream is the final step of the whole degassing process.

16. The process for preparing a polyolefin polymer according to claim 13, wherein the polyolefin particles are transferred pneumatically by a gas stream from a penultimate degassing step to the final degassing step and the gas for carrying out the pneumatic transfer is at least partly composed of nitrogen which had previously been used for degassing the polyolefin particles in the final degassing step.

17. The process for preparing a polyolefin polymer according to claim 16, wherein the degassing step carried out immediately before the final step of the degassing process, in which the polyolefin particles are contacted with the nitrogen stream, is a step which includes a deactivation of the catalyst system.

18. The process for preparing a polyolefin polymer according to claim 17, wherein the penultimate degassing step includes contacting the polyolefin particles with a nitrogen stream comprising 2 to 20 mol. %, of steam.

19. The process for preparing a polyolefin polymer according to claim 18, wherein the penultimate degassing step is carried out at conditions under which no condensation of water occurs.

20. The process for preparing a polyolefin polymer according to claim 18, wherein at least a part of the nitrogen in the stream comprising nitrogen and steam, which is used in the penultimate degassing step of the degassing process of step c), had previously been used in the final step of the degassing process.

* * * * *